United States Patent [19]

Stanley et al.

[11] 3,972,427

[45] Aug. 3, 1976

[54] APPENDANT ELEVATABLE LOADER FOR VEHICLES

[75] Inventors: Charles R. Stanley, Bellevue; Russell I. Tillman, Auburn, both of Wash.

[73] Assignee: The Boeing Company, Seattle, Wash.

[22] Filed: Sept. 25, 1974

[21] Appl. No.: 509,239

[52] U.S. Cl. ............ 214/38 BA; 214/75 R; 214/512; 214/515; 244/137 R; 280/727
[51] Int. Cl.² ............................................ B64C 1/22
[58] Field of Search ............ 214/38 B, 38 BA, 75 R, 214/512, 515; 244/137 R; 280/150.5

[56] References Cited
UNITED STATES PATENTS

| | | | |
|---|---|---|---|
| 2,565,820 | 8/1951 | Machanic | 214/515 X |
| 2,702,678 | 2/1955 | Flock | 214/38 BA X |
| 3,180,503 | 4/1965 | Shaw | 214/512 X |
| 3,263,832 | 8/1966 | Williams et al. | 214/512 X |
| 3,478,904 | 11/1969 | Courter | 214/75 R |

*Primary Examiner*—Robert G. Sheridan
*Attorney, Agent, or Firm*—Robert W. Beach

[57] ABSTRACT

An elevated frame which can be moved into and out of an elevated vehicle cargo space has an opening through which an elevatable platform can raise cargo to be moved from the platform into the cargo space. One edge of the frame is normally supported from the vehicle, and the opposite edge of the frame can be supported from the ground by segmented legs, the segments of which are foldable upward from ground-engaging condition into contracted condition for reception in the vehicle cargo space. The loader can be made free-standing by supporting on removable legs the edge portion of the frame normally supported from the vehicle.

11 Claims, 30 Drawing Figures

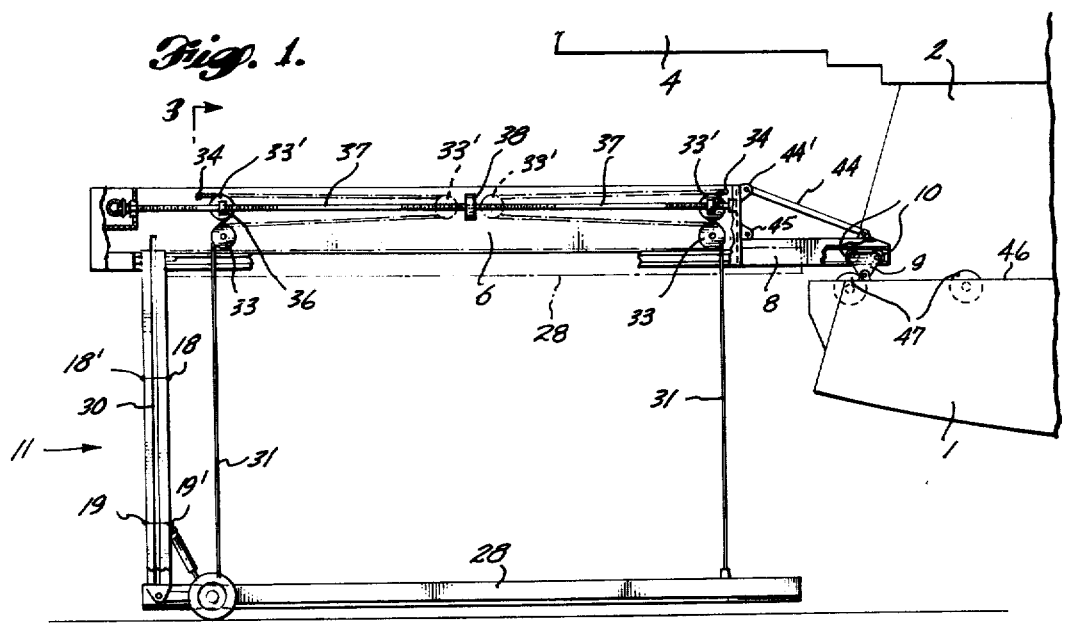

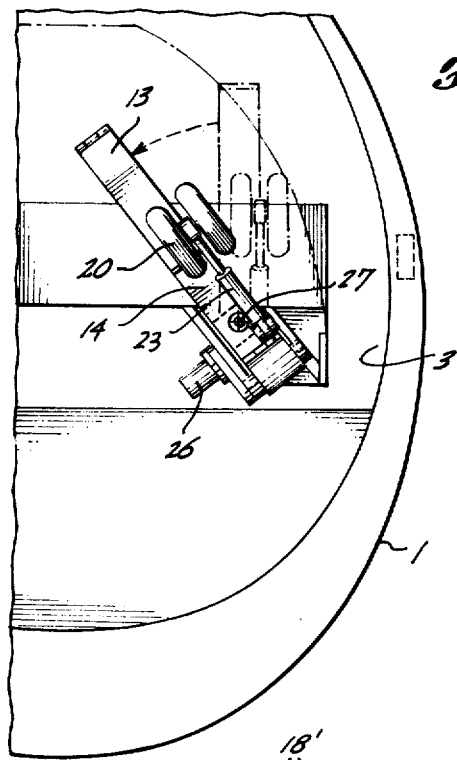
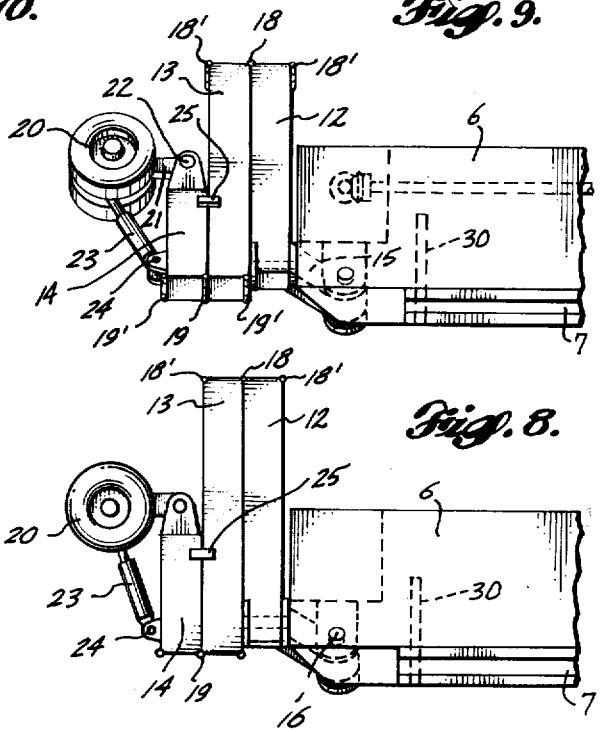
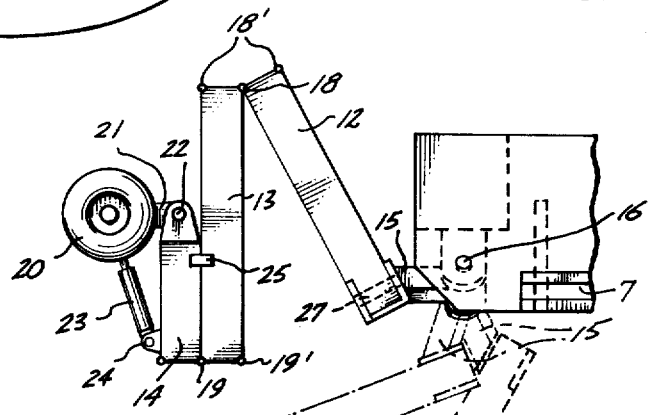
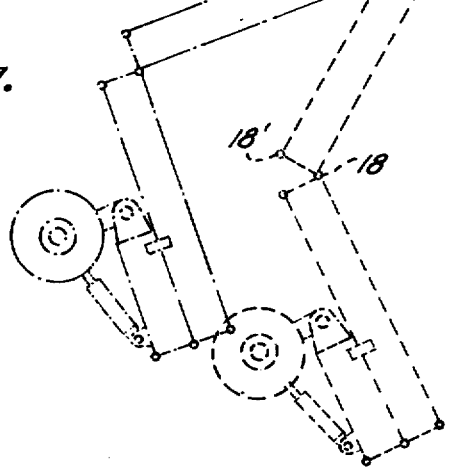
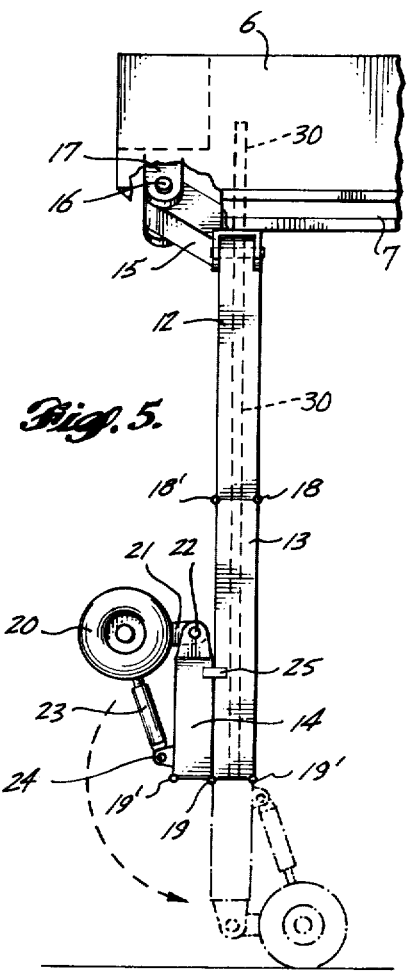

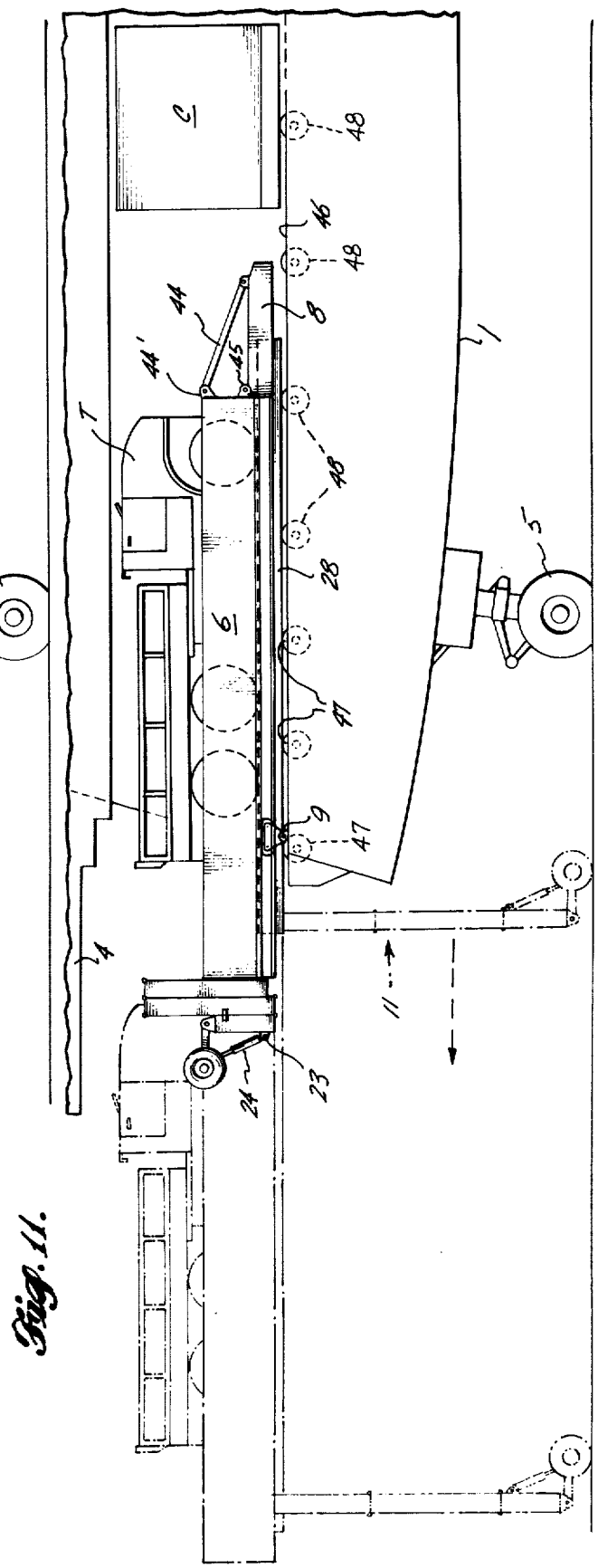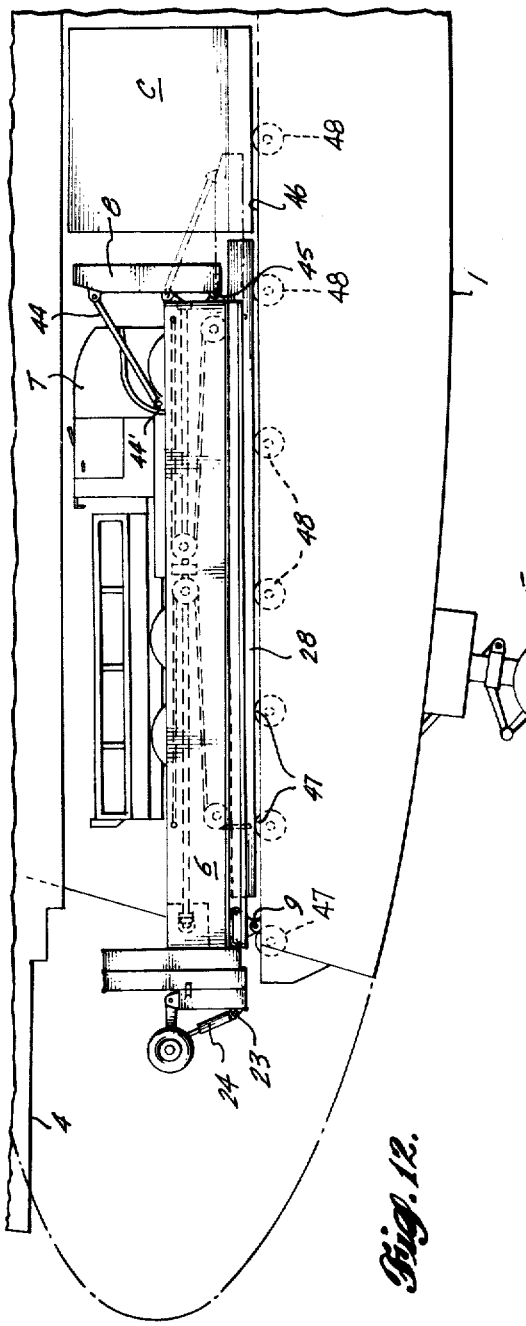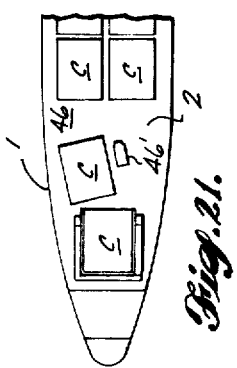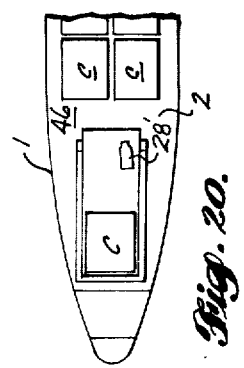

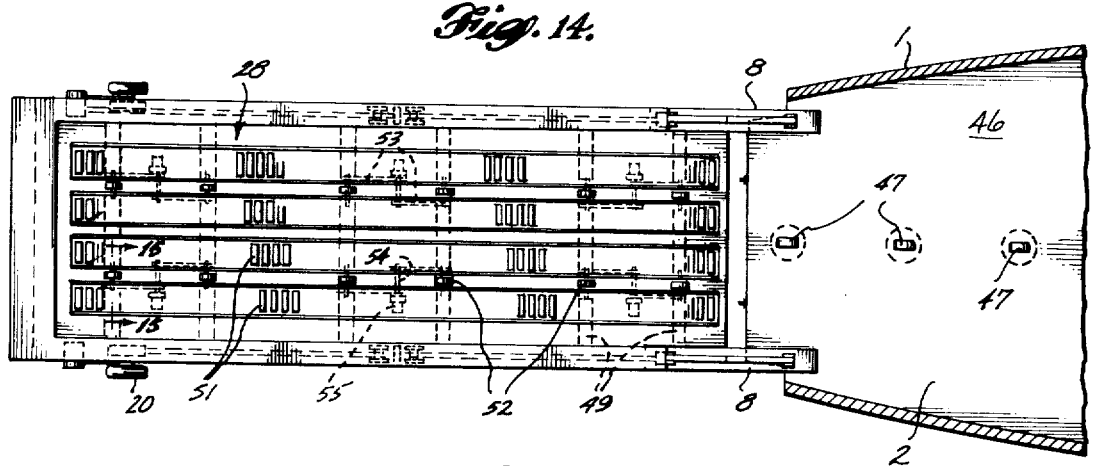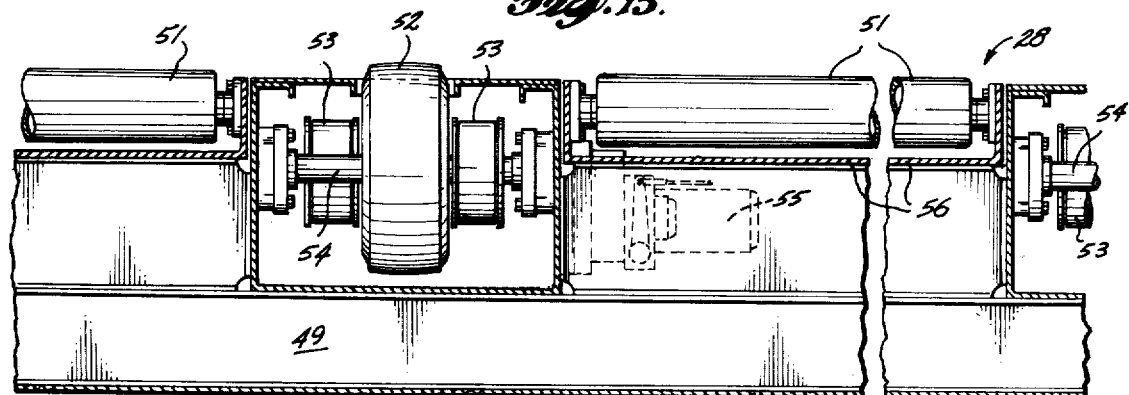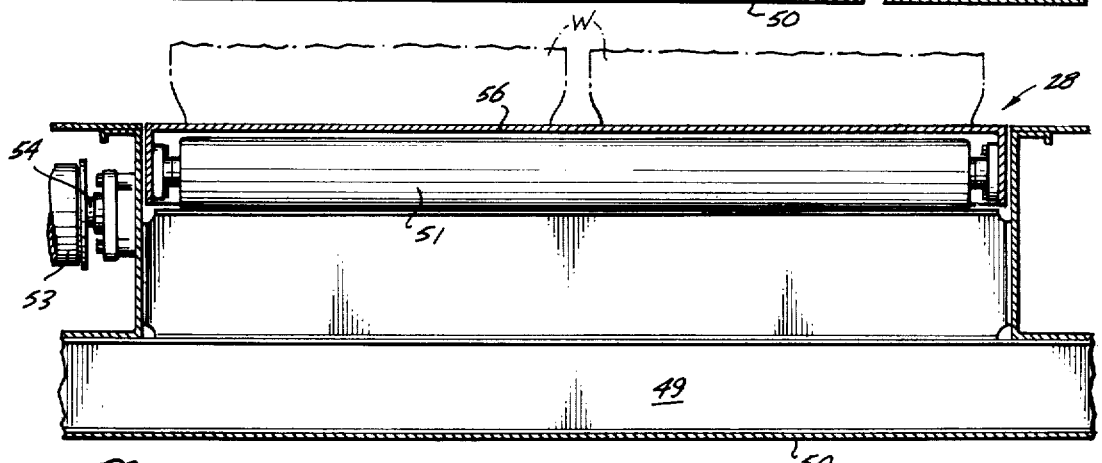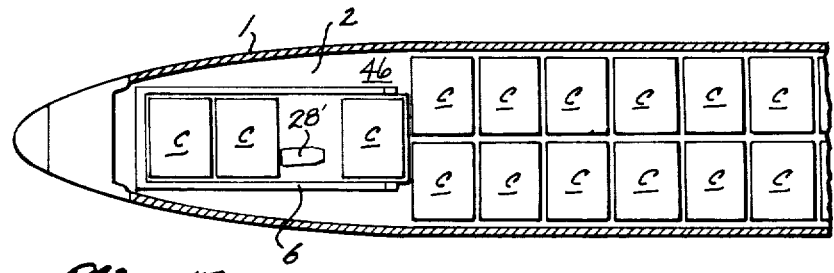

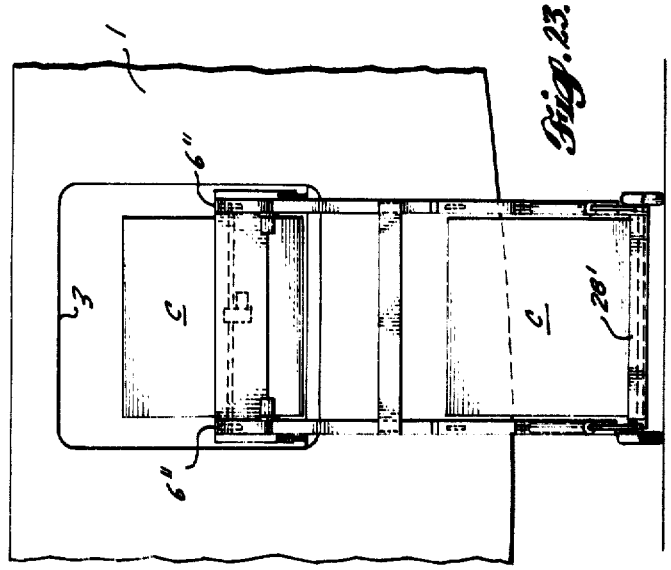
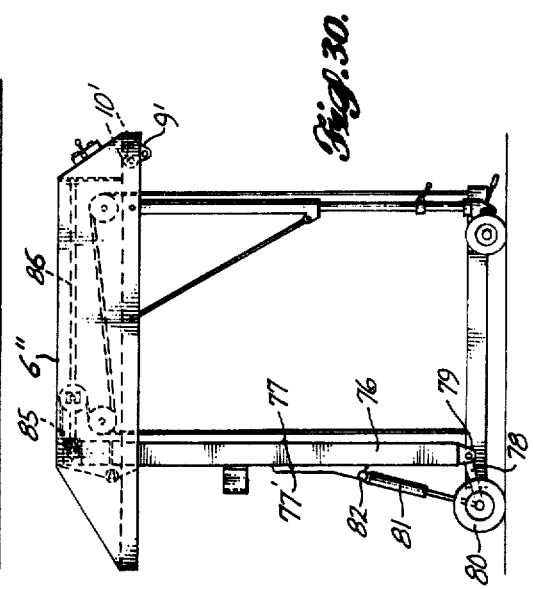
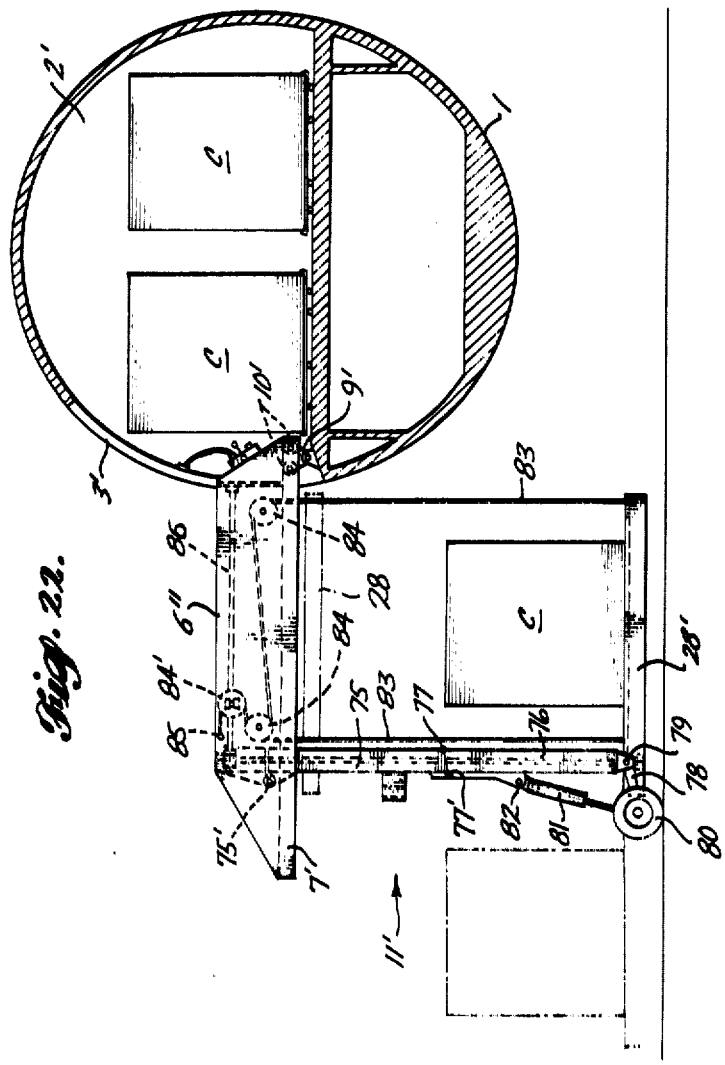
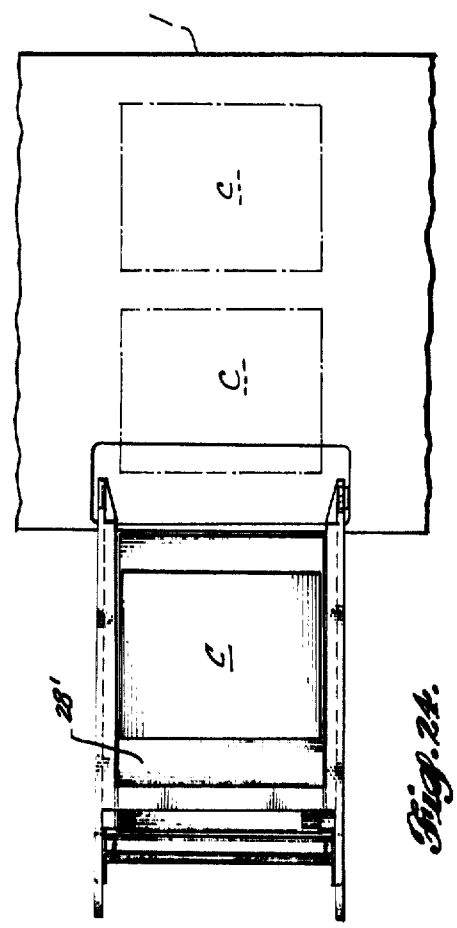

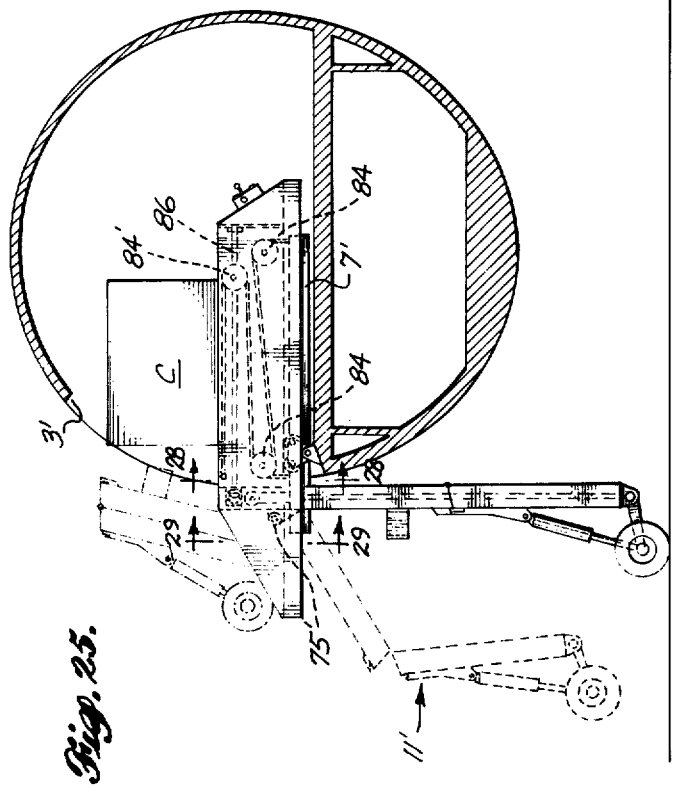
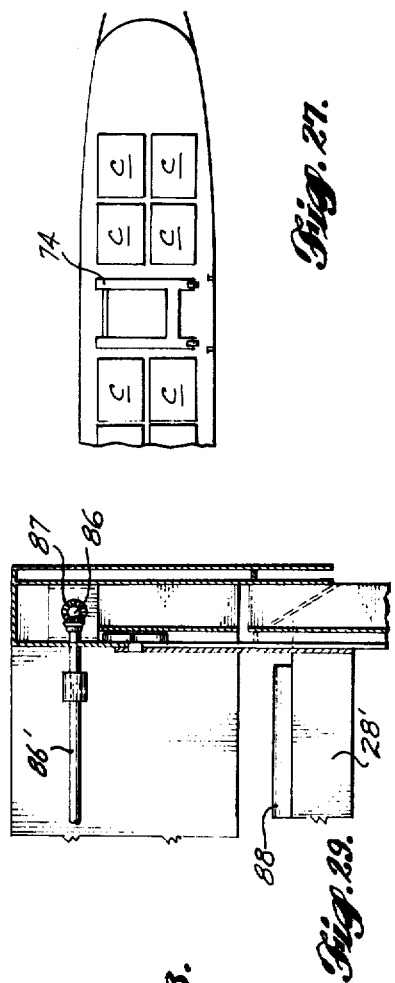
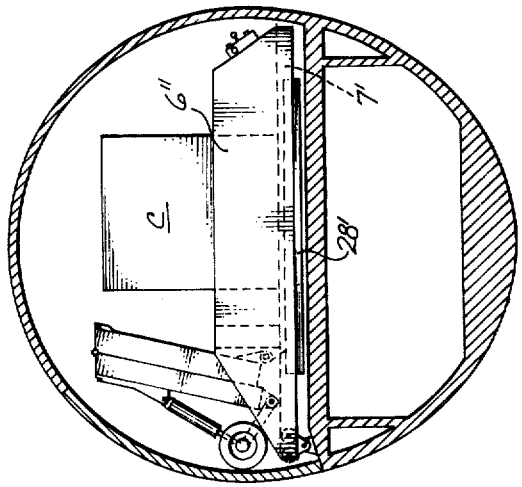
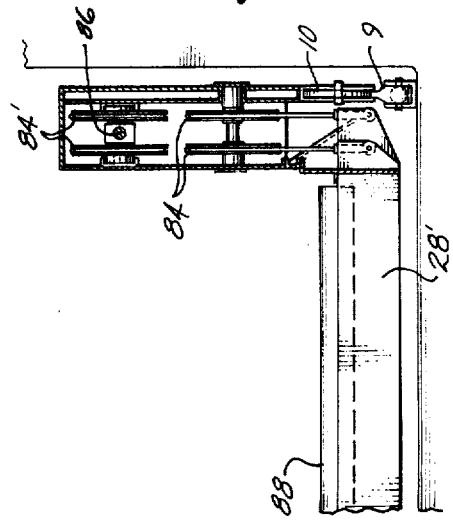

APPENDANT ELEVATABLE LOADER FOR VEHICLES

The invention relates to a loader which can be carried by a vehicle, such as an airplane, in the vehicle cargo space, but which can be withdrawn from such cargo space, supported at least partially from the ground and employed to elevate cargo to the level of elevated vehicle cargo space for transfer into such cargo space.

While this invention could be used for loading an elevated cargo space in vehicles of various types, it is particularly useful for loading a cargo space in a large airplane elevated a substantial distance above the ground. As the technology of building airplanes has progressed, the size of airplanes has increased, and the elevation of cargo space in such airplanes has increased correspondingly. Nevertheless, it is desirable to be able to load cargo into and unload cargo from such elevated cargo space at airports which are not equipped with cargo-handling equipment sufficiently versatile to load cargo into and unload cargo from all types of aircraft.

It is a principal object of the present invention to provide cargo-handling equipment which can be an accessory of the airplane and can be brought to and removed from an airport by the airplane.

A further object is to provide a cargo loader for an airplane which will be sufficiently strong to handle heavy cargo of a size which can be accommodated in the cargo space of the airplane, but which will be comparatively light and compact. In contributing to this object, one portion of the loader can be supported from the airplane and a portion of the loader remote from the airplane can be supported from the ground.

A further object is to provide such a loader in which the ground-engaging means can be contracted upwardly and the loader will be of a size and shape such that it can be received in a portion of the cargo space with minimum sacrifice of the cargo-carrying capacity of the cargo space.

Another object is to provide a loader appendant to an airplane having a portion normally supported from the airplane, but which portion can be supported from the ground so that the entire loader can be supported from the ground independently of the airplane.

FIG. 1 is a side elevation of the appendant aircraft loader having an edge portion supported from the aircraft and having parts broken away.

FIG. 2 is an end elevation of the loader looking toward the aircraft with parts broken away.

FIG. 3 is a vertical section through a portion of the loader taken on line 3—3 of FIG. 1.

FIG. 5 is a side elevation of a portion of the loader showing the ground-engageable member in partially contracted condition and having parts broken away.

FIG. 7 is a side elevation of a portion of the loader showing the ground-engaging member in progressively contracted conditions.

FIG. 8 is a side elevation of a portion of the loader showing the ground-engaging member fully contracted.

FIG. 9 is a side elevation of a portion of the loader similar to that shown in FIG. 8 but with the ground-engageable member in a tilted attitude.

FIG. 10 is an elevation of the same portion of the loader taken perpendicular to FIG. 9.

FIG. 11 is a side elevation of the loader shown partially retracted into the airplane cargo space.

FIG. 12 is a similar elevation showing the loader fully retracted into the cargo space.

FIG. 13 is a somewhat diagramatic horizontal section through the forward portion of an airplane cargo space showing the loader in stowed position and accommodating a type of cargo different from that illustrated in FIGS. 11 and 12.

FIG. 14 is a horizontal section of the loader equipped to handle cargo of the type illustrated in FIG. 13.

FIG. 15 is an enlarged detail vertical section of a fragment of the loader showing cargo-moving mechanism, and FIG. 16 is a similar detail vertical section through a fragment of the loader showing a different type of cargo-moving mechanism.

FIG. 20 is a somewhat diagramatic horizontal section through the forward portion of an airplane cargo space showing a smaller loader than the loader of FIG. 13, and FIG. 21 is a similar view showing a still smaller loader.

FIG. 22 is a side elevation of a small loader similar to the loader shown in FIG. 21 but arranged to load and unload cargo space in an airplane fuselage through a side opening, such fuselage being shown diagramatically in transverse vertical section.

FIG. 23 is an end elevation of the loader shown in FIG. 22, and

FIG. 24 is a plan of such loader.

FIG. 25 is an elevation of the loader shown in FIG. 22 and a vertical section through the airplane fuselage with parts shown in positions different from the positions of FIG. 22.

FIG. 26 is a similar elevation of the loader and vertical transverse section through an airplane showing parts in still different positions.

FIG. 27 is a diagramatic horizontal section through an airplane fuselage having a cargo space like that of FIGS. 22, 25 and 26.

FIG. 28 is a detail vertical section through a portion of the loader taken on line 28—28 of FIG. 25.

FIG. 29 is a detail vertical section through a portion of the loader taken on line 29—29 of FIG. 25.

FIG. 30 is a side elevation of the loader shown in FIG. 22 having its structure modified so as to be freestanding.

The purpose of the loader of this invention is to be able to load large, heavy cargo quickly and easily into the cargo space of a large airplane elevated a substantial distance above the ground. While such loader should be capable of being separated from the airplane, it should also be sufficiently light and compact to be stowed aboard the airplane with minimum loss of cargo space. Moreover, the loader should be convertible from freestanding condition to stowed condition quickly and with minimum physical effort. The loader should also be easily changeable to handle cargo of different types effectively.

Figure 6:
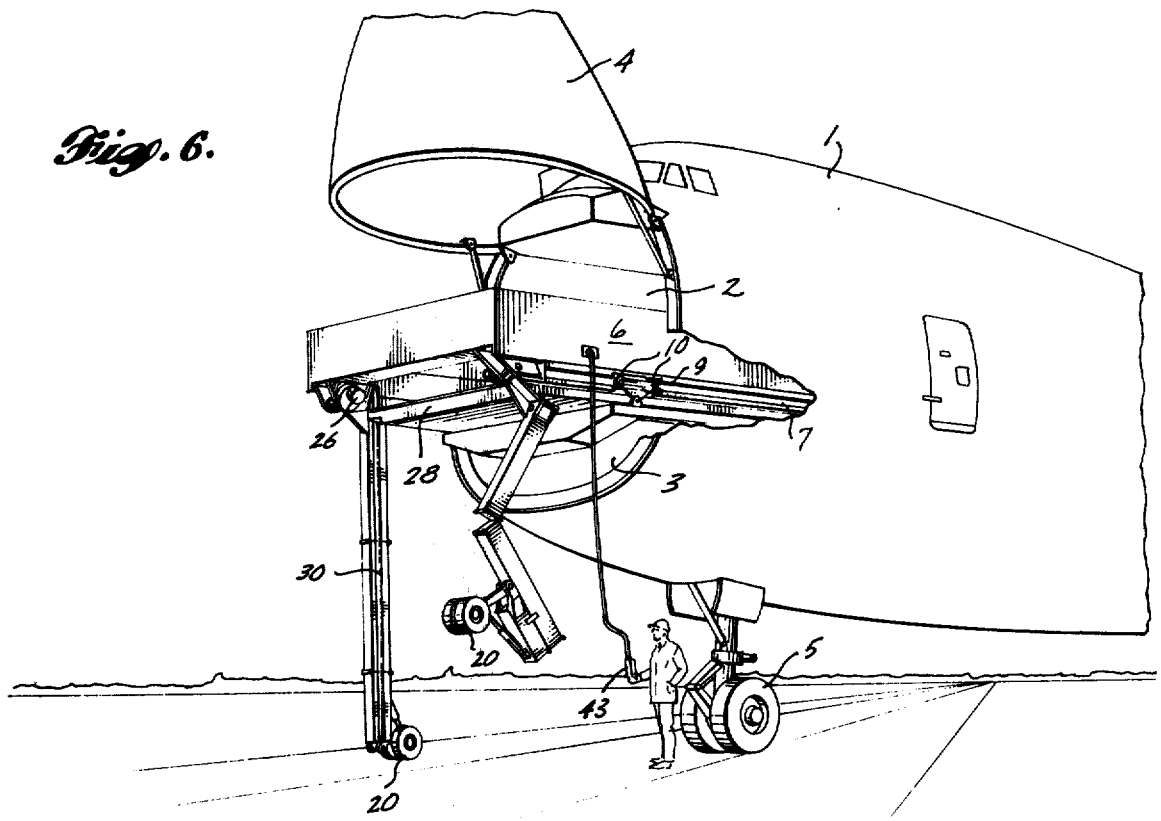
FIG. 6 is a perspective of the loader showing the ground-engaging member further contracted.
Figure 4:
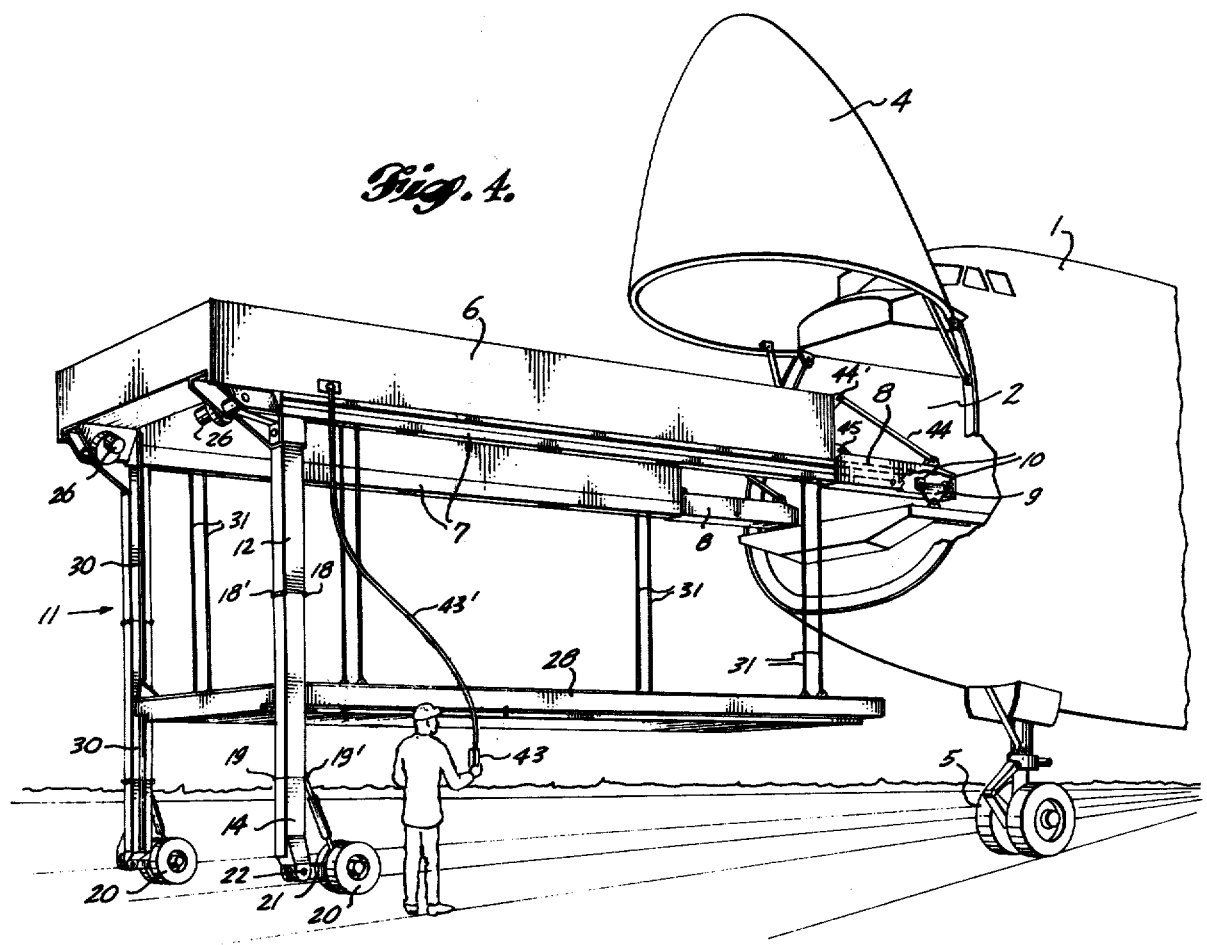
FIG. 4 is a perspective of the loader in condition for loading cargo into or unloading cargo from an airplane.

In FIGS. 1, 4 and 6, in particular, a large airplane 1 is illustrated having in its fuselage a cargo space 2 elevated a substantial distance above the ground. The bottom of such cargo space may, for example, be 10 to 15 feet above the ground. It is, therefore, necessary that a loader be capable of raising heavy cargo such a distance. The loader includes means facilitating movement of such cargo relative to the loader through the access opening 3 into the cargo space. The access opening illustrated in FIGS. 1, 2, 4 and 6 is in the nose end of the airplane fuselage and is closable by a door of dome shape swingable about a top hinge from the closed position, indicated in broken lines in FIG. 12, into the upwardly swung open position shown in FIGS. 4 and 6.

The loader of the present invention does not depend on any special type of dock being provided but is supported, at least in part, from the same surface as that supporting the landing gear 5 of the airplane. The loader includes a frame 6 which is U-shaped in plan, the opposite sides of which are supported by parallel horizontal rails 7 of channel shaped cross section. Normally the loader is appendant to the airplane rather than being freestanding. Thus, one end of each rail 7 is supported from the airplane, and the other end of each rail is supported from the ground independently of the airplane.

The dependent support for the two ends of the rails 7 closer to the airplane includes rail extensions 8 having hollows in extension of the hollows of the channel rails 7. Attachments 9 are located adjacent to the opening 3 to the cargo space and preferably are connected to the airplane structure by removable pins. Each attachment carries a pair of rollers 10 that are receivable in the hollows of the corresponding rail extensions 8 (FIG. 4) or rails 7 (FIG. 6) for supporting such rail extensions or rails from the airplane.

The ends of the rails 7 remote from the airplane are supported from the ground by stilts 11, that is, long slender legs. Each of these legs, as shown best in FIGS. 5 and 7, is composed of a plurality of sections or segments joined end-to-end. The legs shown in these figures are composed of three segments including an upper segment 12, an intermediate segment 13, and a lower segment 14. The leg is carried by a mounting arm 15 attached at an angle to the upper end of the upper segment 12, as shown best in FIG. 2. Such arm is mounted by a pivot end 16 in a clevis 17 mounted on the frame 6 adjacent to the corresponding ends of rails 7.

The stilts are articulated by the adjacent ends of adjacent sections being pivotally connected. Referring to the upright positions of the stilts, as shown in FIGS. 1, 2 and 4, the lower end of the upper segment 12 is connected to the upper end of the intermediate segment 13 by a pivot or hinge 18 at one side of the segments. The joint is rigidified when the stilt is in its upright position by projections 18', such as hinge knuckles, mounted on the opposite sides of the segment ends which interdigitate. The lower end of the intermediate segment 13 is connected to the upper end of the lower segment 14 by a pivot or hinge 19 at the side of the stilt opposite pivot 18. This connection is rigidified by projections 19' at the side of the stilt opposite pivot 19 which interdigitate. Such pivots or hinges and the interfitting projections thus strongly resist relative twisting of the stilt segments.

The stilts 11 are mobile so that the loader can move toward and away from the airplane 1. Such mobility is afforded by wheels 20 mounted adjacent to the free ends of arms 21 pivotally connected to the lower ends of the stilts. The ends of such arms remote from the wheels are connected by pivots 22 to the lower ends of the lowest stilt segments 14. Each wheel is resiliently mounted relative to its stilt by a shock absorber 23 having its lower end connected to an arm 21 adjacent to a wheel 20 and inclined upwardly toward the stilt with its upper end connected by pivot 24 to a lug on leg segment 14 adjacent to the upper segment end. Swinging of arm 21 about its pivot 22 will be snubbed and cushioned by variation in length of the shock absorber 23.

Each of the stilts 11 is contractable upward toward the frame 6. The first step in effecting such contraction is to swing the lower segment 14 with the wheel 20 upward about pivot 19 from the position shown in FIGS. 1, 2 and 4 to the position of FIG. 5. Before such swinging can be effected, either the frame 6 must be retracted into the cargo space of the airplane until the center of gravity of the loader is disposed inwardly of the attachment members 9 so as to relieve the stilts of supporting load, or one stilt is contracted, as indicated in FIG. 6, while the other stilt remains in contact with the ground to support the outboard end of the loader. The segment 14 can be swung manually upward into the position shown in FIG. 5 alongside the intermediate segment 13 and held in that position by suitable spring detent or hook latch members 25.

Further contracting of the stilt is accomplished by swinging angle-mounting arm 15 about the axis of its mounting pivot 16. When such arm is swung fully in the counterclockwise direction, as seen in FIG. 5, the upper end of the upper segment 12 abuts against the underside of a rail 7, so as to transmit load directly from the frame 6 through the rail 7 and the stilt to the ground. Motors 26, shown in FIG. 2, are operable to rotate pivots 16. If such a pivot is rotated in the clockwise direction as viewed in FIGS. 5 and 7, the upper segment 12 of the stilt secured rigidly to the arm 15 will be swung successively through the positions shown in FIG. 7 in dashed lines, in dot-dash lines, and in solid lines. As the arm 15 swings, therefore, upper segment 12 will be swung from the upright position shown in FIG. 5 until its lower end rises into the upright position shown in FIG. 8.

Since the intermediate segment 13 is freely pivoted to the upper segment 12 by the pivot 18, the lower two segments of the stilt will swing relative to the upper segment 12 to maintain the center of gravity of the composite structure of segments 13 and 14 directly beneath the pivot 18. The interdigitated projections 18' at the side of the stilt opposite the pivot 18 will separate progressively farther, as indicated in the various positions of FIG. 7. Eventually, when the initially upper segment 12 has swung into upright position with its previously lower end uppermost, segment 13 will hang from pivot 18 in its upper end in a position close alongside segment 12, as shown in FIG. 8.

When in its fully-contracted condition of FIGS. 8 and 9, the contracted composite stilt can turn about a pivot 27 between the broken-line line position and the full-line position of FIG. 10, corresponding respectively to the positions of FIGS. 8 and 9. The turned position of the folded stilt may be selected as necessary to stow the stilt structure most conviently for moving the loader as far as possible into the cargo space of the airplane, as indicated in FIG. 12.

The load-hoisting elevatable platform 28 of the loader can be of different types and supported and elevated in different ways. Preferably the frame 6 is of U shape providing an opening upward and downward forming a passage through which a load can be moved by the platform 28. Such platform is shown in FIGS. 2 and 4 as being guided for elevational movement by slides 29 carried by the platform sliding along slots 30 provided in the respective stilts 11 and extending into the sides of frame 6.

The platform 28 is supported and raised and lowered relative to the frame 6 by a system of supporting cables 31. As shown best in FIGS. 1, 3 and 4, the lower end of these cables are attached by suitable fittings 32 to the platform. Each cable 31 extends from the platform upward over a fixed guide pulley 33 and a movable guide pulley 33'. The upper end of each cable is anchored at 34 to the frame 6. As shown best in FIG. 3, each corner of platform 28 is supported by a pair of parallel cables 31. Each movable guide pulley 33' is mounted on an axle 35 that in turn is supported by a nut 36 threaded onto a lead screw 37, as shown best in FIGS. 1 and 3. The central portion of such lead screw is carried by a bearing 38 and the hoisting cable drives including pulleys 33' are located at opposite sides of such central bearing.

The lead screws 37 at opposite sides of the frame 6 are connected by a cross-shaft 39 acting through beveled gearing 40. A motor 41 connected through reduction gearing 42 to the cross shaft 39 will rotate the lead screws 37 through the bevel gears 40 to shift pulleys 33' toward or away from their respective pulleys 33 along the lead screws 37. Such movement of the pulleys 33' will increase or decrease the length of the return-bent portion of the lines 31, so as to raise and lower the load-elevating platform 28 in a substantially horizontal position. The guide pulleys 33 are mounted sufficiently high in frame 6 to provide clearance so that the platform 28 can be lifted into a horizontal position at the same level as floor 46 of the cargo-carrying hold 2.

Energization of motors 26 for contracting and extending the stilts 11 and motors 41 for controlling lifting of the platform 28 can be controlled remotely from a switch block 43 suspended by an electrical cable 43' and positioned for convenient manipulation by an operator, as illustrated in FIGS. 4 and 6.

The deck of the elevatable platform 28 and the deck of the cargo space 2 can be constructed differently to accommodate to best advantage the type of cargo to be loaded into and unloaded from the airplane cargo space 2. In FIGS. 11 and 12, the platform is constructed to handle both containers C and trucks T. The loader is maintained in position for movement of cargo from the loader onto the floor of the cargo space when the loader is in its fullest extended position shown in FIG. 4. In this position the rail extensions 8 engage with the attachments 9 supported from the airplane adjacent to the inboard end of the loader frame. The ends of the rail extensions 8 remote from the frame are braced by diagonal struts 44 connected between such rail extension ends and lugs 44' at the top of the frame 6. The ends of the rail extensions adjacent to the frame 6 are connected to the frame by pivots 45 so that such extensions can be swung from their extended positions shown in FIGS. 1 and 11 upward into the retracted positions of FIG. 12 by sliding lugs 44' along the upper portion of the frame from the position of FIG. 11 to the position of FIG. 12.

To enable the loader to be retracted into the cargo space of the airplane over its floor 46 from the position of FIGS. 1 and 4 to positions such as shown in FIGS. 6, 11 and 12, a single row of rollers 47 shown in FIG. 14 and plural rows of rollers 48 disposed further inward, as shown in FIGS. 11 and 12, are mounted on the cargo deck 46 to support the elevatable platform. The lower side of platform 28 is formed by a sheet 50 carried by transverse platform beams 49, which sheet rides on the rollers 47 and 48.

In order to enable the platform 28 to be used conveniently for loading and unloading a variety of different types of cargo, the construction should enable containers C or similar objects to be moved from the platform to the cargo space for loading the cargo space and from the cargo space back to the platform for unloading.

FIGS. 14 and 15 show structures of the elevatable platform 28 enabling containers C to be moved onto the end of the platform remote from the airplane shown at the left of FIG. 14, then hoisted by lifting the platform to a position level with the floor 46 of the cargo compartment, as shown in broken lines in FIG. 11, and then shifted from the end of the platform 28 adjacent to the airplane shown at the right of FIG. 11 into the airplane cargo space. After the containers have been transferred from the elevatable platform to the cargo space, they can be shifted by any desired means and supported by any suitable means (not shown) carried by the floor 46 of the cargo space.

To support the containers C on the platform 28 for being shifted lengthwise of such platform, a plurality of parallel rows of load-supporting rollers 51 is provided, which rows extend lengthwise of the platform. The rollers are sufficiently close together so as to avoid excessive load being carried by any individual roller. Between adjacent rows of rollers are located resilient traction wheels 52 driven by belt and pulley drives 53 from shafts 54 that are turned by electric motors 55 controlled from a switch block 43 shown in FIG. 4 as being held in the operator's hand. The motors 55 are reversible so that the traction wheels 52 can be turned in either direction to shift a container supported by rollers 51 toward either end of the platform 28.

If it should be desired to carry a truck T on the platform 28, as shown in FIGS. 11 and 12, it is necessary to cover the idler rollers 51 so that the truck can be driven onto the platform and off the platform again. In FIG. 16 a shallow channel cover 56 is shown over a row of load-supporting rollers 51 with the flanges on its opposite edges projecting downward so that the truck wheels W shown in broken lines in that figure can obtain traction on the cover, whereas they would not be able to obtain traction on the idler rollers 51. The cover 56 can be made as part of the roller assembly so that each roller section can be turned over to place the rollers up or the cover up. A truck can thus be driven onto the platform 28 in its lowered position of FIG. 1, raised to the broken-line position shown in FIG. 1 and then driven onto the cargo floor 46. Alternatively the truck can be stowed with the loader. After platform 28 is raised, and the frame can then be moved through the intermediate position shown in FIG. 11 into the stowed position shown in FIG. 12.

A typical operation utilizing the outboard loader described above, would involve loading containers C onto the elevatable platform 28 when the platform is in the position shown in FIG. 1. The operator would then press the proper switch to drive motor 41 for hoisting platform 28 to the broken-line position shown in FIG. 1. Motor 55 would then be energized to turn friction wheels 52 in the direction for moving the containers C from the platform 28 into the airplane cargo space. The motor 55 would then be stopped and the platform lowered again to the position of FIG. 1 by reversing motor 41. The next four containers would then be loaded on the platform 28 and it would be raised in the same manner as described above and the containers offloaded into the cargo space. This operation would be repeated until the airplane cargo space had been filled, as illustrated in FIG. 13.

In the last loading operation, containers C could be loaded on the platform as indicated in FIG. 13. Space is left between containers C to clear access opening 28' through the platform 28. When the loader is stowed, opening 28' is in registration with hatch 46' in cargo space floor 46. Alternatively, a truck T could be loaded on the platform after inverting the roller assembly so that the covers 56 overlie the side rows of rollers 51, as shown in FIG. 16. In either case, after the load had been hoisted to the position of FIG. 11, the loader with its load can be retracted into the end portion of the cargo space, as illustrated in FIGS. 13 and 12. In order to complete stowing of the loader, it is necessary to contract the stilts supporting the outer end of the loader frame from the ground in the manner described above and illustrated in FIGS. 5, 7, 8 and 9.

When the stilts have been moved into their fully folded positions of FIGS. 8 and 12, the folded stilts are tilted about pivots 27 from the broken-line position shown in FIG. 10 to the solid-line position, so as to clear the nose cone 1 when it is swung into closed position. At the destination of the airplane, the truck and/or containers can be removed from the cargo space of the airplane in reverse order. The frame will be withdrawn from the storage space sufficiently to enable the stilts to be rotated about pivot 27 from the solid-line position to the broken-line position in FIG. 10, and then motor 26 can be driven to swing arm 15 in the counterclockwise direction so that the stilt will unfold from the folded condition of FIG. 8 through the solid-line position, the dot-dash line position, and the broken-line position of FIG. 7 to the position of FIG. 5. The lower leg segment can then be swung down from the solid-line position of FIG. 5 into the broken-line position, so as to support the end of the loader remote from the airplane.

The loader will then be in a condition for being rolled outwardly from the cargo space on wheels 20 and rollers 47 and 48. The load carried on the loader platform during the flight of the airplane can then be lowered, and the truck T can then be driven off the loader platform or the power wheels 52 can be rotated to unload containers C. Next, the elevatable platform is raised, receives the next load of containers from the cargo space, the platform is lowered, and the containers are removed from the platform. Successive groups of containers are lowered and removed similarly until the entire cargo space of the airplane or as much of such space as desired is unloaded.

Figure 17:
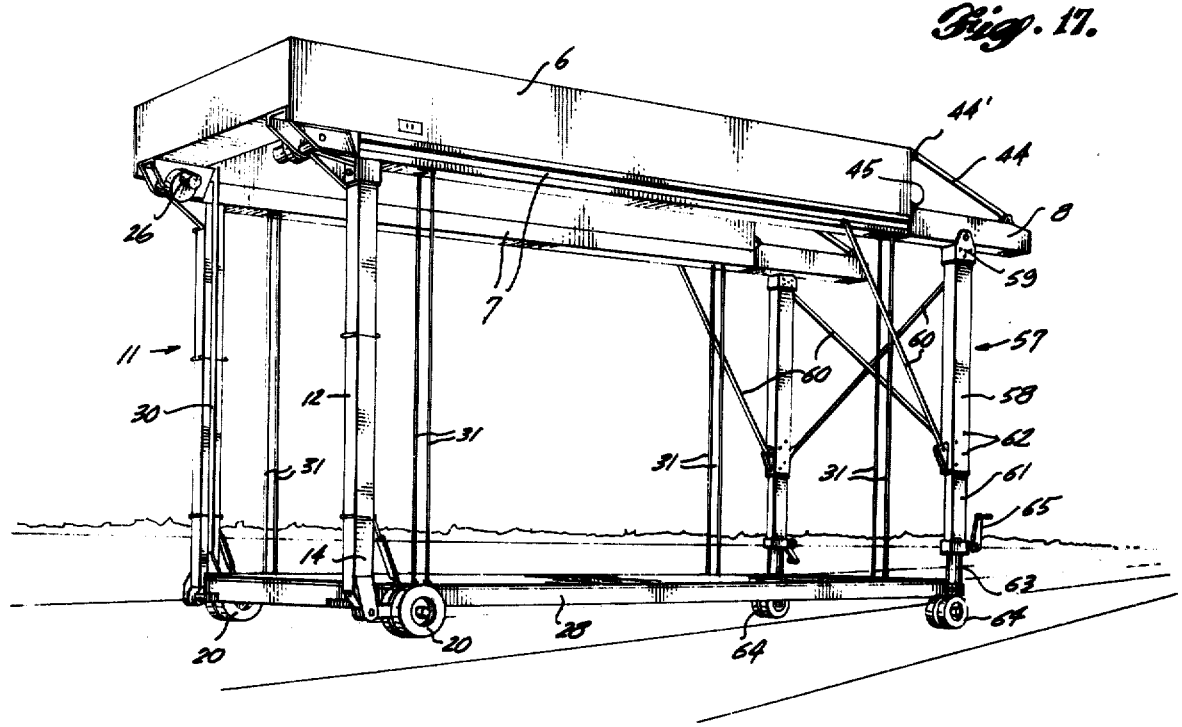
FIG. 17 is a perspective of the cargo loader corresponding to FIG. 4 but showing the loader provided with ground-engaging members enabling the loader to be freestanding independent of the airplane.

In the above description of the use of the loader, the loader was described as being stowed in the airplane cargo space at the end of the loading operation and unloaded from the airplane cargo space at the beginning of the unloading operation. The loader would be accommodated in the airplane in this manner if it were expected that a similar loader would not be available at the destination of the airplane either to unload its cargo or to load its cargo as might be required. If such a loader were available at the destination of the airplane, however, it would not be necessary for the loader to be transported, and, instead, it might be possible to load additional cargo into the cargo space of the airplane to occupy the space which otherwise would be required for the loader. If the loader is not to be transported with the airplane, it can be detached from attachment members 9 and made freestanding, as shown in FIG. 17, instead of being appendant to the airplane, as shown in FIGS. 1 and 4. The loader is made freestanding by substituting additional stilts 57 for the attachments 9 to support the end of the loader frame adjacent to the airplane. Such stilts could be folded relative to the frame when not in use, but preferably are detachable from the loader.

The stilt structure 57 includes two stilts, each having an upper segment 58 attached by a fitting 59 to a rail extension 8 in place of the attachment 9. Such attachment can be detached by removing the pin connecting its bottom to a lug on the airplane. The upper segments 58 of the stilts are braced against tilting relative to the rails 7 by diagonal transverse and longitudinal brace struts 60 inclined upward to the frame of the loader from the lower portions of the segments 58. Such brace struts can be foldable relative to the leg or loader frame or can be completely detachable. Lower segments 61 of the stilts are telescopically received in the upper segments 58 and held in the approximately desired lengthwise relationship to such segments by pins 62 extending through apertures in the telescoping sections.

Each stilt can be varied in effective length, more exactly by fitting the lowest stilt segment 63 telescopically in the intermediate segment 61. This lowest segment carries ground-engaging wheels 64. The elevation between a lowest segment 63 and an intermediate segment 61 can be adjusted accurately by worm and rack mechanism, for example, operated by turning crank 65. When the stilts 57 have been fitted on the loader, it can be towed at will over the ground supported by wheels 20 and 64.

Figure 19:
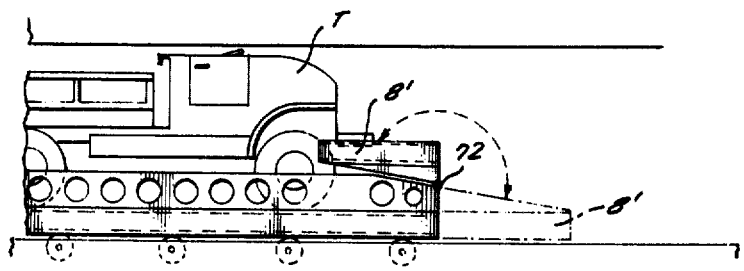
FIG. 19 is a side elevation of a portion of the loader showing a detail of its construction.
Figure 18:
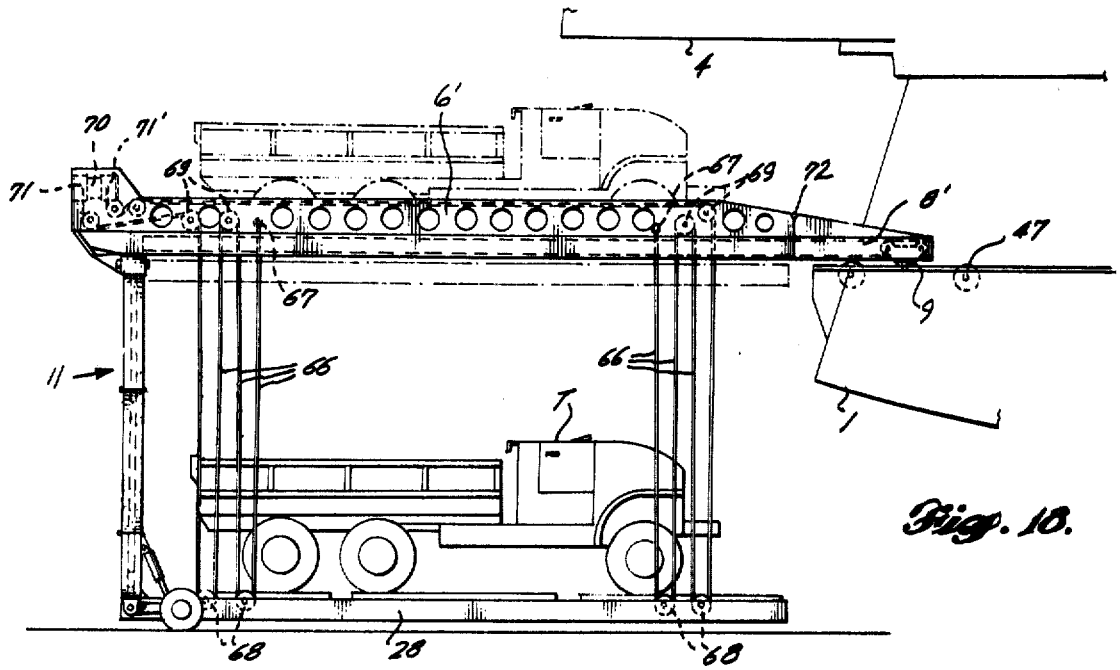
FIG. 18 is a side elevation of a loader having a modified type of lifting mechanism.

A somewhat modified type of loader is shown in FIGS. 18 and 19. In this instance again the end of the frame 6' remote from the airplane is supported by stilts 11. The platform 28 is supported from the frame by a plurality of stretches 66 of each cable. The end of each cable is anchored at 67 to the frame and the cable extends alternatively around pulleys 68 journaled on the platform 28 and pulleys 69 journaled on the frame. The cables are all reeled in and payed out by a single winch 70 having twin drums 71 and 71'. By having more stretches of cable connecting the frame 6' and the platform 28 than shown in FIGS. 1 and 4, greater loads on the platform can be hoisted than can be lifted on the platform of FIGS. 3 and 4 for a given size of cable.

In the frame of the loader shown in FIGS. 18 and 19 the rail extensions 8' with which the attachments 9 are engaged can be swung about pivots 72 through approximately 180° between the broken-line position and the solid-line position of FIG. 19 instead of being swung from a horizontal position only into an upright position, as illustrated in FIG. 12.

While the loader shown in FIGS. 18 and 19 is larger than the loader shown in FIGS. 1, 4 and 6, for example, it is practical to use a loader smaller than the latter loader particularly for smaller airplanes. Such smaller loaders occupy less of the airplane cargo space. In FIG. 20 a loader 73 is shown somewhat diagramatically that has approximately half the capacity of the loader shown in FIGS. 1, 4 and 6. The platform of the loader 73 will accommodate only two containers C instead of four of such containers.

In FIG. 21 the loader 74 shown diagramatically is still smaller. That loader will accommodate only a single container C. The structure of the loaders 73 and 74 can be generally of the same type as the loader described in connection with FIGS. 1 to 17 inclusive.

The loader shown in FIG. 21, while being capable of handling only a single container at a time, is still shown as being provided to load and unload the cargo space of an airplane through an opening of the nose of the airplane. FIGS. 22 to 30 illustrate utilization of a loader of the same size for loading and unloading cargo space 2' in an airplane through an opening 3' in the side of the fuselage. In this instance the portion of the loader frame 6'' remote from the airplane is supported by stilts 11' composed of only two segments. The upper segment 75 and the lower segment 76 are connected by a pivot 77 at one side of the leg and interdigitatable projections 77' are provided at the opposite side of the leg. A generally horizontal arm 78 has one end connected by a pivot 79 to the lower end of the leg segment 76, and the end of arm 78 remote from the leg carries wheels 80. Such arm end is yieldably connected to a portion of the leg segment 76 spaced upward from the pivot 79 by a resilient shock absorber 81 connected to the segment 76 by a pivot 82.

The stilts 11' can be contracted upwardly in a manner generally similar to the contraction of the stilts shown in FIGS. 7 and 8 by swinging the upper segment 75 about the pivot 75' adjacent to its upper end from the solid-line position through the broken-line position to the dot-dash line position shown in FIG. 25. The end of the frame adjacent to the airplane can be connected to the airplane by an attachment 9' having rollers 10' received in rails 7' extending along opposite sides of the bottom of frame 6''. When the cargo space of the airplane has been all loaded or all unloaded, the loader can be stowed in the airplane fuselage immediately inwardly of the side opening 3', as shown in FIG. 27. To prepare the loader for stowing, it is moved from the position shown in FIGS. 22 and 24 inwardly to the position shown in FIG. 25. The stilts are then moved into contracted condition which will enable the loader to be further retracted from the position of FIG. 25 into the fully stowed position of FIG. 26.

The platform 28' is supported from the frame 6'' by cables 83 having their lower ends connected to the elevatable platform 28' and their upper portions extend around guide pulleys 84. The ends of the cables 83 are anchored at 85 to the frame 6'' after passing around pulleys 84' carried by a nut that can travel on a lead screw 86 generally in the manner described in connection with the loader of FIG. 1 with reference to FIGS. 1, 2 and 3. The lead screw is turned by a power-driven shaft 86' through bevel gears 87, as shown in FIG. 29.

The platform 28' of loader of FIGS. 22 to 29 may also have rollers 88 on its upper side for enabling a container C to be pushed easily over the platform.

We claim:

1. An appendant loader for loading and unloading cargo space of a vehicle through an upright opening in a wall of the vehicle comprising a substantially horizontal frame adjacent to the upright vehicle opening, load-hoisting means carried by said frame and raisable relative to said frame substantially vertically upward from a position below said frame to lift a load upward sufficiently for substantially horizontal movement thereof through the upright wall opening into the cargo space, guide means carried by the vehicle and guiding said frame with said load-hoisting means carried thereby for edgewise substantially horizontal movement through the upright wall opening into and out of the cargo space, and supporting means independent of the vehicle and said guide means engageable with the ground and providing support for the portion of said frame exteriorly of the upright vehicle wall opening during movement of the frame through such opening.

2. The loader defined in claim 1, in which the supporting means includes leg means having a plurality of leg sections foldable about hinge means from downwardly extended condition upwardly relative to the horizontal frame into contracted condition for movement with the frame into the cargo space.

3. The loader defined in claim 2, in which the leg means in upwardly contracted condition is disposed adjacent to an edge of the frame in a position higher than the bottom of the frame.

4. The loader defined in claim 2, and skew axis means guiding the leg means for rotation to effect folding of the leg sections.

5. The loader defined in claim 2, and pivot means guiding the folded leg sections for rotation about a generally horizontal axis into stored position.

6. The loader defined in claim 2, the hinge means guiding two leg sections for movement into side-by-side relationship.

7. The loader defined in claim 2, in which the leg means includes at least three leg sections hingedly connected for folding in zigzag substantially parallel relationship.

8. The loader defined in claim 2, including a generally horizontal arm, pivot means pivotally connecting said arm to the lower portion of the lowest leg section when the leg means are in downwardly extended condition for swinging up and down about a horizontal axis, wheel means carried by the end of said arm remote from said pivot means, and inclined shock absorber means bridging across said pivot means and connected between a portion of the lowest leg section above said arm and a portion of said arm spaced from said pivot means.

9. The loader defined in claim 1, independent means connected to a portion of the frame remote from the supporting means and of approximately the same length as such supporting means for supporting from the ground a portion of the frame spaced from the portion of the frame supported by the supporting means, and adjusting means for adjusting elevationally the portion of the frame supported by the independent means for leveling the frame to maintain the frame in substantially horizontal position independently of the vehicle.

10. The loader defined in claim 9, in which the additional independent means are disconnectable from the frame.

11. The loader defined in claim 1, in which the vehicle is an airplane including a fuselage, the upright opening being in one end of said fuselage.

* * * * *